United States Patent [19]

Scaramucci

[11] Patent Number: 4,872,477
[45] Date of Patent: Oct. 10, 1989

[54] SWING CHECK VALVE

[76] Inventor: John P. Scaramucci, 10724 Woodridden, Oklahoma City, Okla. 73170

[21] Appl. No.: 249,942

[22] Filed: Sep. 27, 1988

Related U.S. Application Data

[60] Division of Ser. No. 49,383, May 13, 1987, Pat. No. 4,809,738, which is a continuation-in-part of Ser. No. 23,786, Mar. 9, 1987, abandoned.

[51] Int. Cl.$^4$ .............................................. F16K 15/03
[52] U.S. Cl. .............................. 137/515.5; 137/527.4; 137/527.8
[58] Field of Search .................. 137/515.5, 515.7, 527, 137/527.4, 527.8

[56] References Cited

FOREIGN PATENT DOCUMENTS 1162820 2/1984 Canada ............................. 137/527.8
2079406 11/1980 United Kingdom ............. 137/527.8

Primary Examiner—Robert G. Nilson
Attorney, Agent, or Firm—Dunlap, Codding, Peterson & Lee

[57] ABSTRACT

A swing check valve having a readily replaceable valve seat and having a cage surrounding the disc in the final closing movement of the disc sized to guide the disc evenly onto the seat.

3 Claims, 9 Drawing Sheets

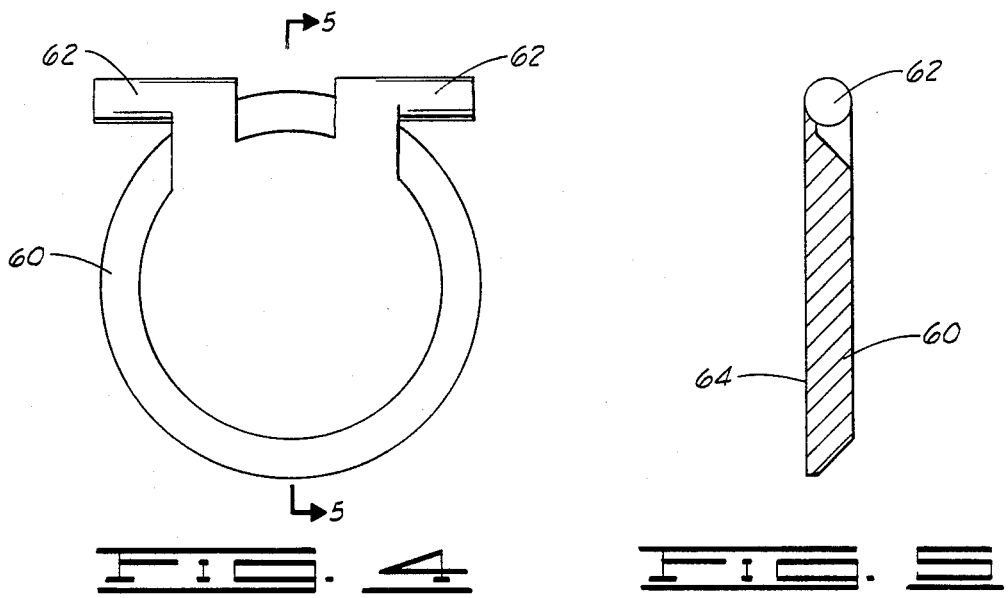
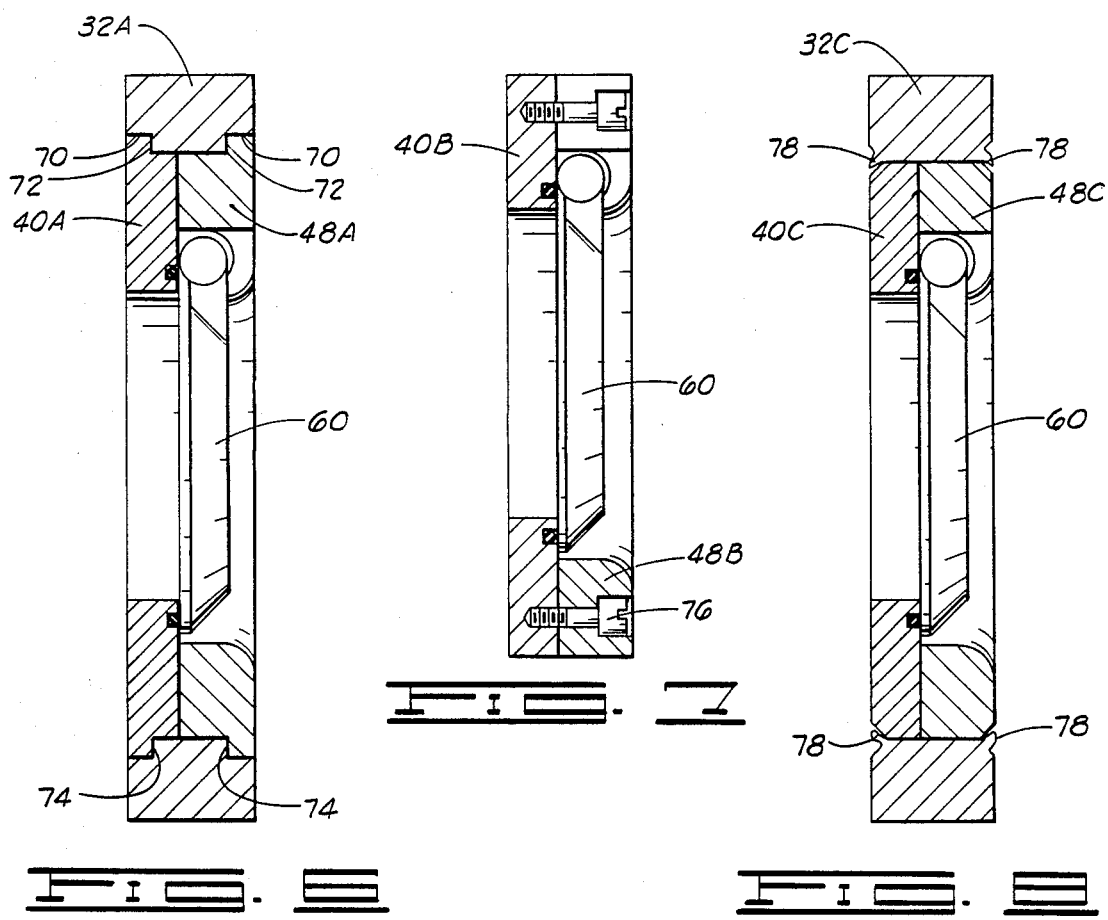

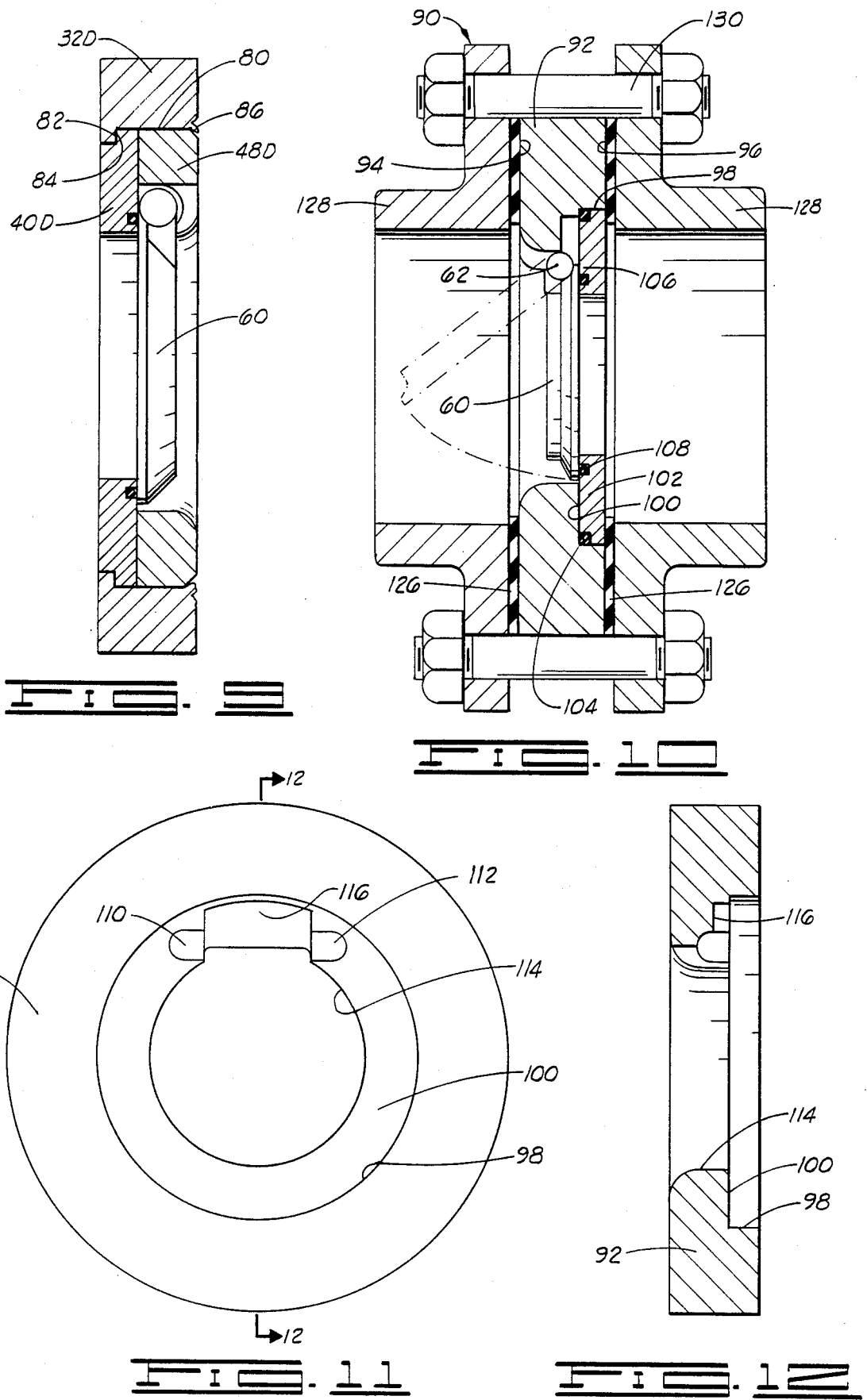

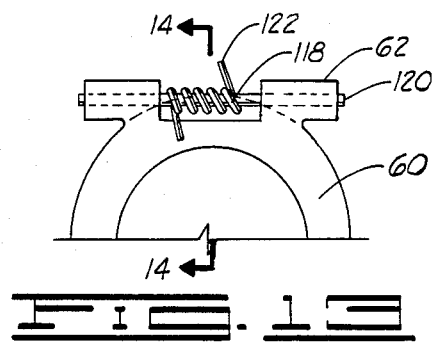
FIG. 13
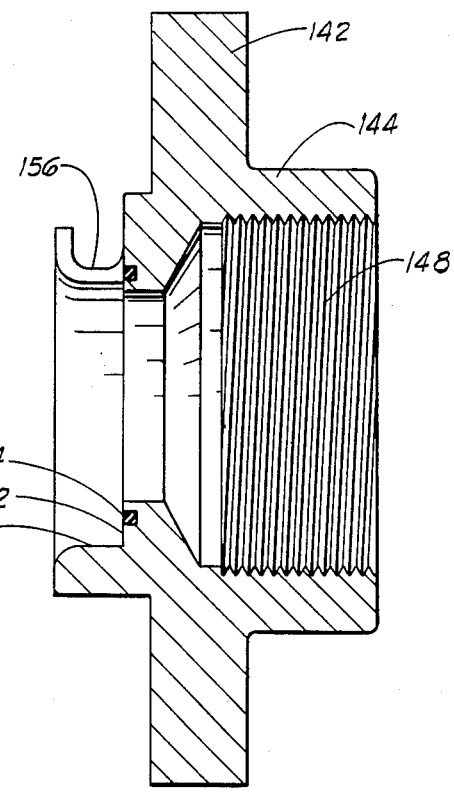
FIG. 17
FIG. 14
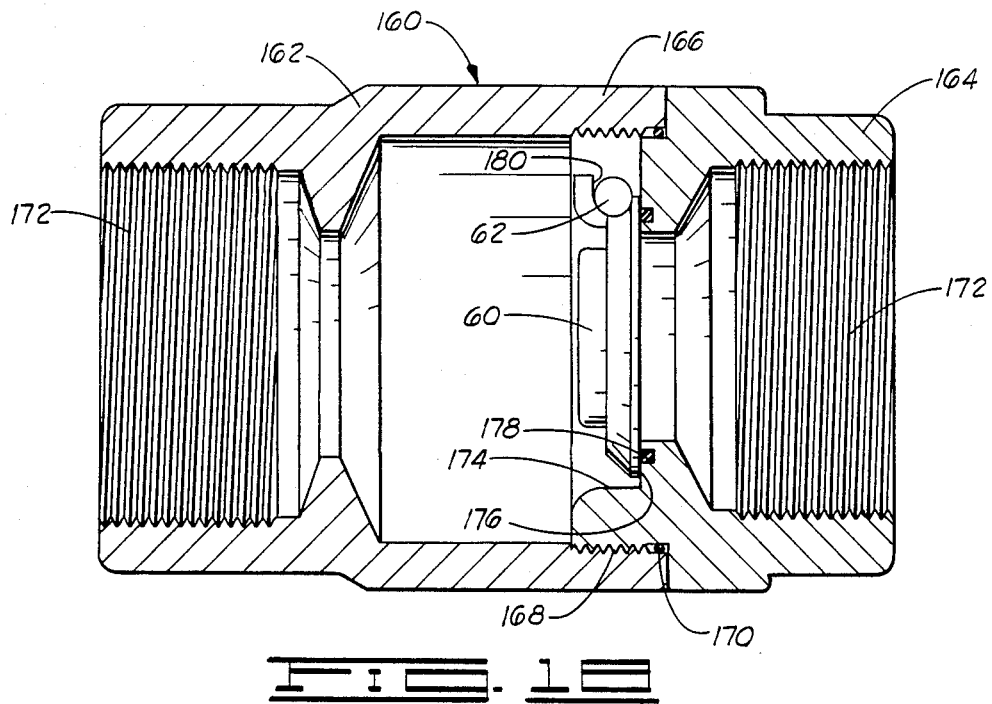
FIG. 18

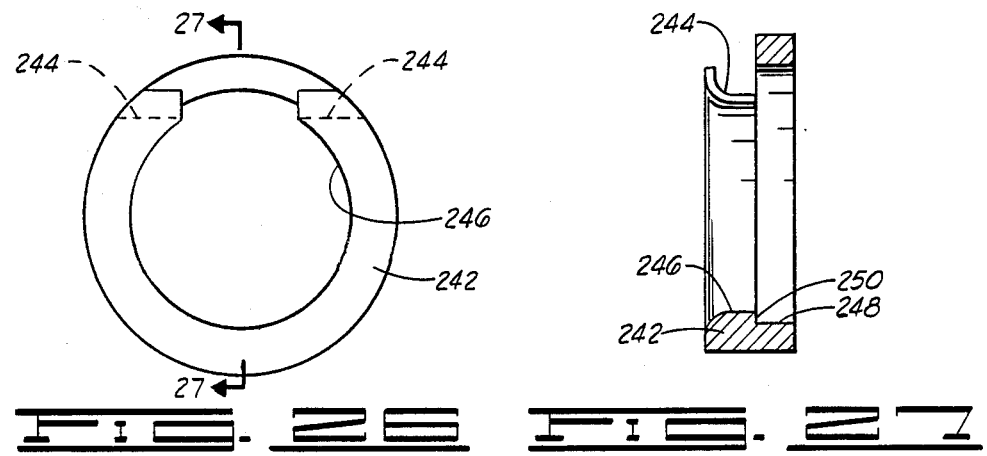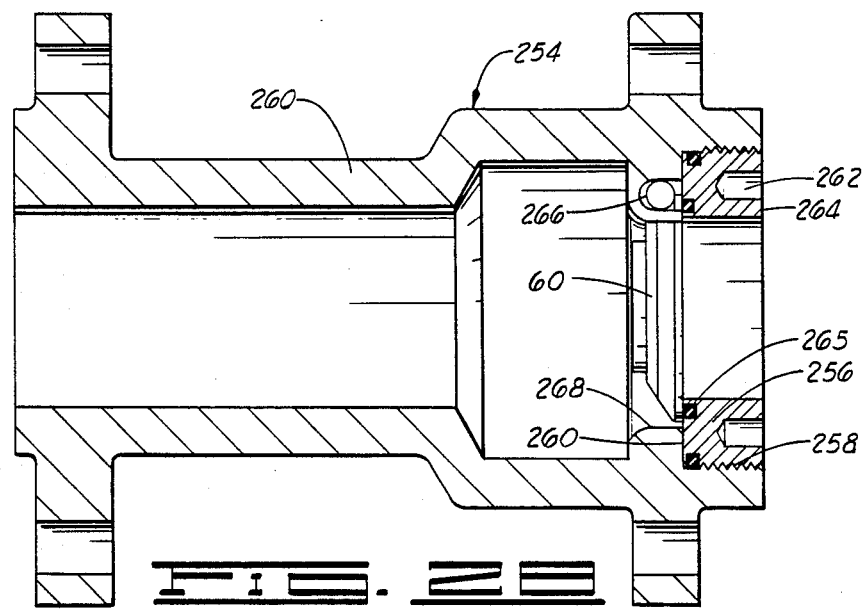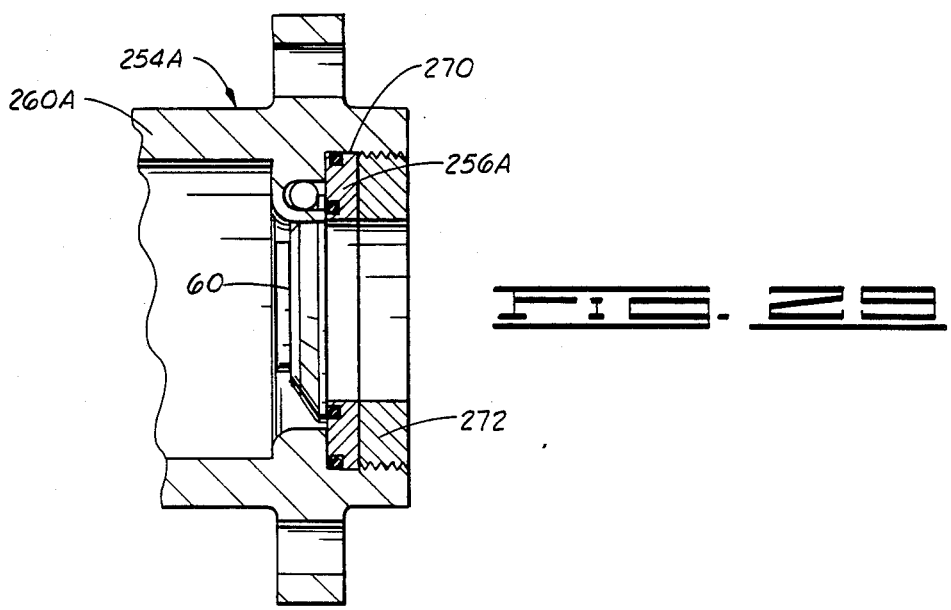

SWING CHECK VALVE

This is a division of application Ser. No. 49,383, filed May 13, 1987, and now U.S. Pat. No. 4,809,738, which in turn is a continuation-in-part of application Ser. No. 23,786, filed Mar. 9, 1987, now abandoned.

BACKGROUND OF THE INVENTION

1. Field of the Invention.

This invention relates to improvements in check valves, and more particularly, swing-type check valves.

2. Discussion of the Prior Art.

The part of a swing check valve most normally subject to wear and need of renewal or replacement is the valve seat. Thus, when the valve seat is an integral part of the valve body, and the seat becomes worn, the most commonly accepted practice is to replace the entire valve. Thus, it is desirable to have a replaceable valve seat.

The hanger, or hangers, in a swing check valve for journaling the hinge pin of the valve disc sometimes become worn, with the result that the valve disc may not always seat evenly on the valve seat, resulting in possible wear of the valve seat and therefore leakage through the valve when the valve is supposed to be closed. Similar problems occur in those designs of swing check valves where the hinge pin is loosely journaled on purpose to provide a "floating" movement of a valve disc to and from the seat.

A comparable problem exists in swing check valves where the hinge pin is secured in a mating bore formed transversely through the disc. In such constructions, the hinge pin bore is frequently not precisely parallel with the seating face of the disc, such that the disc will be hung at an angle to the valve seat and even closure around the entire sealing face of the valve seat is not obtained.

BRIEF DESCRIPTION OF THE DRAWINGS

FIG. 4 is an elevational view of the valve disc of the valve shown in FIG. 1.

FIG. 5 is a cross sectional view taken along lines 5—5 of FIG. 4.

FIG. 6 is a cross sectional view through a modified construction of the valve body, valve seat and cage for the valve shown in FIG. 1.

FIG. 7 is another modification of the valve seat and cage for the valve shown in FIG. 1.

FIG. 8 is another modified valve body, seat and cage for the valve shown in FIG. 1.

FIG. 9 is still another modification of the valve body, seat and cage for the valve of FIG. 1.

FIG. 10 is a cross sectional view through another form of valve constructed according to this invention.

FIG. 11 is an end view of the valve body of the valve shown in FIG. 10 looking at the right-hand side of the valve body in the illustration of FIG. 10.

FIG. 12 is a cross sectional view taken along lines 12—12 of FIG. 11.

FIG. 13 is a modified construction for the hinge pin of the valve shown in FIG. 10.

FIG. 14 is a cross sectional view taken along lines 14—14 of FIG. 13.

FIG. 17 is a cross sectional view taken along lines 17—17 of FIG. 16.

FIG. 18 is another form of valve constructed pursuant to this invention.

FIG. 26 is an end view of the cage of the valve of Fig. 25.

FIG. 27 is a cross sectional view taken along lines 27—27 of FIG. 26.

FIG. 28 is a cross sectional view of another valve constructed pursuant to this invention.

FIG. 29 is a cross sectional view of a modification of the valve shown in FIG. 28.

DETAILED DESCRIPTION OF THE DRAWINGS

Figure 1:
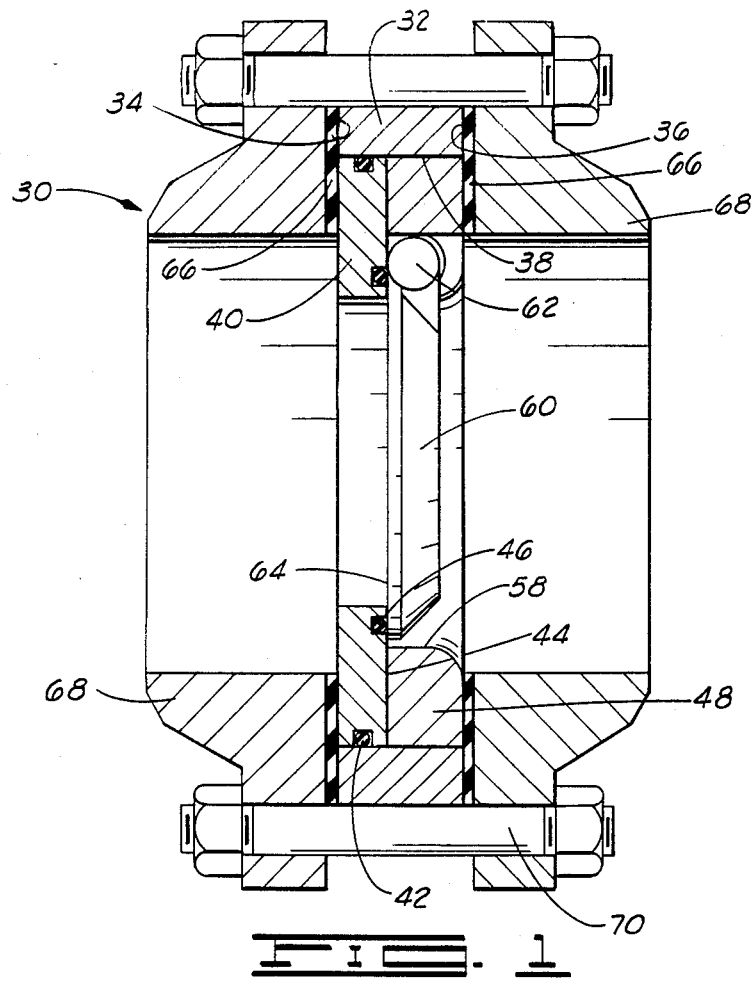
FIG. 1 is a cross sectional view through one form of swing check valve constructed in accordance with this invention.

Referring to the drawings in detail, and particularly FIG. 1, reference character 30 generally designates a wafer-type swing check valve constructed pursuant to this invention. The valve includes a tubular valve body 32 having planar ends 34 and 36, as well as a uniform inner diameter to provide a uniform inner periphery 38. A valve seat 40 in the form of a ring is positioned in one end portion of the valve body 32 and is provided with an O-ring seal 42 positioned in a cooperating groove in the outer periphery thereof to sealingly engage the inner periphery 38 of the valve body 32. The seating face 44 of the valve seat 40 is also provided with a sealing ring 46 positioned in a complementary groove for purposes to be described.

Figures 2, 3:
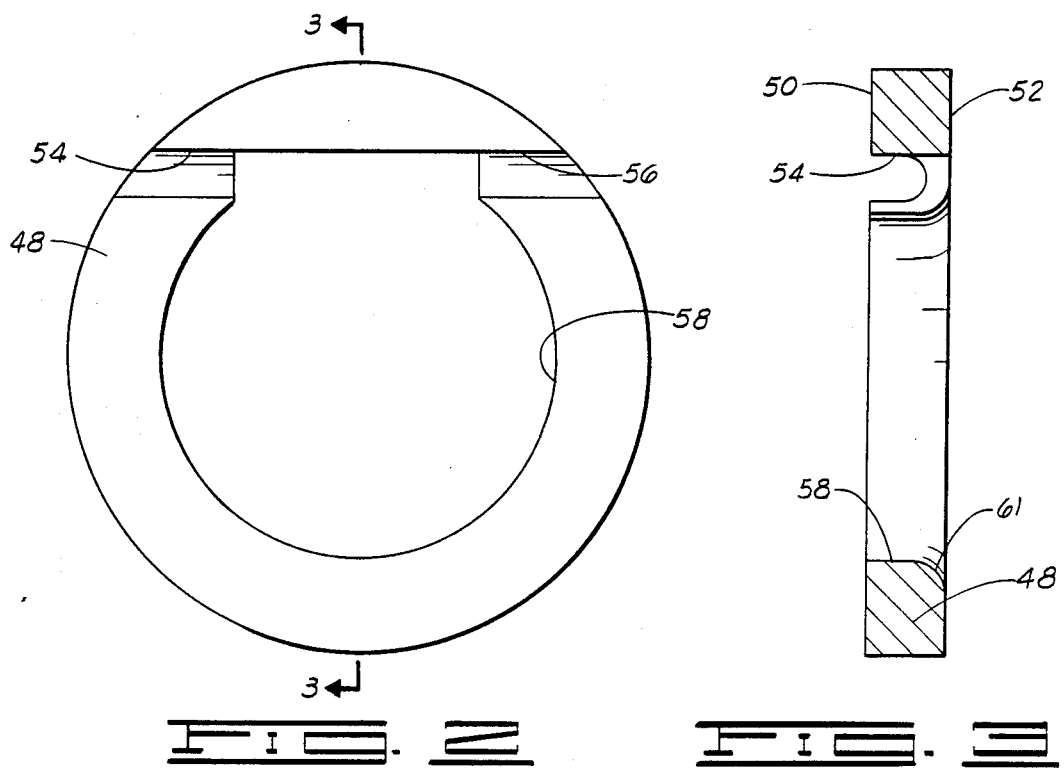
FIG. 2 is an end view of the cage ring of the valve shown in FIG. 1.
FIG. 3 is a cross sectional view taken along lines 3—3 of FIG. 2.

A valve cage 48, basically in the form of a ring, is also positioned in the valve body 32 in abutting relation to the valve seat 40. The cage 48 is illustrated in detail in FIGS. 2 and 3. As shown, the cage 48 has planar ends 50 and 52. A pair of grooves 54 and 56 are formed in the face 50 of the cage 48 intersecting the inner periphery 58 of the cage. The grooves 54 and 56 are in alignment to form hanger means for the hinge pin of a valve disc as will be described.

The valve disc 60 of the valve 30 is illustrated in detail in FIGS. 4 and 5. As shown, the valve disc 60 is a round disc and has a pair of hinge pins 62 formed thereon to fit in the slots 54 and 56 of the cage 48. The hinge pins 62 and the slots 54 and 56 are sized in such a way that the valve disc 60 can move a limited distance toward and away from the valve seat 40 along the axis of the valve seat.

The seating face 64 of the disc 60 is sized to mate with the seating face 44 of the valve seat 40 and engage the seal ring 46 when the valve is closed. It should also be noted that the seating face 64 is parallel with the axis of the hinge pin 62. By forming the pins 62 integrally with the disc, as by casting, the pins 62 can easily and efficiently be formed parallel with the seating face 64, such that the seating face 64 of the disc will engge the seating face 44 of the valve seat 40 around the entire seating faces.

The cage ring 48 surrounds the disc 60 with the inner surface 58 of the cage 48 extending around more than one-half of the outer periphery of the disc. The diameters of the disc 60 and the inner surface 58 of the cage ring 48 preferably have a diametrical clearance of between 1/64" and 3/32", such that the cage 48 will guide the disc 60 in its final closing movement toward the valve seat 40 and assure that the seating face 64 of the disc will evenly engage the seating face 44 of the valve seat 40. However, the end portion 61 of the cage inner surface 58 is curved radially outwardly to provide clearance for the disc 60 as the disc swings.

The valve seat 40 and cage 48 are sized in such a way that when they are in abutting relation as shown in FIG. 1, they fill the valve body 32, with the outer faces of the valve seat 40 and cage 48 being co-terminus with the end faces 34 and 36 of the valve body. In an assembled condition, elastomeric gaskets 66 are positioned at the opposite ends of the valve body and the valve is held in assembled relation by conventional pipe flanges 68 held in assembled relation by bolts 70 against the gaskets 66.

A modified valve body, seating ring and cage for the valve 30 are illustrated in FIG. 6. As shown, the modified valve body 32A has a counterbore 70 in each end thereof to provide annular shoulders 72 facing outwardly from the valve body. Each of the modified valve seat 40A and cage 48A is provided with an annular shoulder 74 on the outer periphery thereof sized to mate with the respective body shoulder 72 when the modified valve seat 40A and cage 48A are in abutting relation as shown in FIG. 6. With this arrangement, no seal between the modified seat 40A and the modified valve body 32A is required. And, the modified valve body 32A, modified seating ring 40A and modified cage 48A can be readily utilized as a wafer-type check valve in the manner illustrated in FIG. 1.

A further modified valve seat and cage are illustrated in FIG. 7 for use in the valve body 32 of the valve 30 previously described. In this form, the modified valve seat 40B and cage 48B are interconnected by screws 76. With this arrangement, the modified valve seat, modified cage and disc 60 are replaceable as a unit in the valve 30 in the event of wear to the valve seat or valve disc.

The valve body, seat and cage of the valve 30 may also be formed as illustrated in FIG. 8. In this configuration, the modified valve body 32C has the ends thereof crimped at 78 adjacent the inner periphery thereof against the outer faces of the modified valve seat 40C and cage 48C to maintain the modified body, seat and cage in assembled relation. The modified valve body 32C with the seating ring 40C and cage 48C therein will be held between flanges with sealing gaskets in the same manner as illustrated in FIG. 1.

FIG. 9 illustrates another form of modified valve body 32D, modified valve seat 40D and cage 48D for the valve 30 shown in FIG. 1. A counterbore 80 is provided through the major portion of the length of the valve body 32D to provide an annular shoulder 82 around the inner periphery of the valve body. An annular shoulder 84 is provided around the outer periphery of the valve seat 40D to mate with the shoulder 82 and hold the valve seat 40D in position. The modified valve cage 48D is held in position in the counterbore 80 by a crimp 86 around the inner peripheral portion of the modified valve body 32D. Thus, the modified valve body 32D, seat 40D and cage 48D can be used between flanges with sealing gaskets in the same manner as with the valve 30 illustrated in FIG. 1.

Another form of wafer-type valve is illustrated in FIG. 10 and generally designated by the reference character 90. In this construction, the tubular valve body 92 has planar ends 94 and 96. A counterbore 98 is provided in the end 96 of the valve body and provides an annular shoulder 100 facing the respective end of the valve body. A valve seat 102 is positioned in the counterbore 98 against the shoulder 100 and is sealed therein by a seal ring 104 positioned in a mating groove around the outer periphery of the valve seat. The inner peripheral portion of the end surface of the valve seat 106 facing away from the end 96 of the valve body 92 forms a seating surface and is provided with a suitable sealing ring 108 mounted in a mating groove therein.

The valve body 92 is shown separately and in detail in FIGS. 11 and 12. As shown, a pair of grooves 110 and 112 are formed in the end wall 100 of the counterbore 98 adjacent the inner periphery 114 of the valve body. The grooves 110 and 112 are in axial alignment to receive the hinge pins 62 of the valve disc 60 and therefore form the hanger means for the valve disc. The relative sizing of the hinge pins 62 and grooves 110 and 112 is preferably the same as the relationship between the hinge pin and the hanger means previously described in connection with FIGS. 1–5, such that the disc 60 can move a limited distance to and from the valve seat 102 along the axis of the valve seat. In this connection, it will be noted that the inner periphery 114 of the valve body 92 is generally circular in configuration to surround the major portion of the outer periphery of the valve disc 60, and the diameter of the surface 114 relative to the outer diameter of the disc 60 (adjacent the seat 102) is such to provide a diametrical clearance of between 1/64" and 3/32", such that the surface 114 guides the valve disc to and from the valve seat 102.

It will also be observed in FIGS. 11 and 12 that a recess 116 is provided in the shoulder 100 of the valve body between the grooves 110 and 112. Such recess is provided to make room for a coiled spring 118 as illustrated in FIGS. 13 and 14. In this form of valve, a secondary rod or pin 120 extends through the hinge pins 62 to support the coiled spring 118. One end 122 of the spring 118 bears against the valve seat 102 as illustrated in FIG. 14 (or against some other stationary part of the valve) and the opposite end 124 of the spring 118 bears against the disc 60. The winding of the coil 118 is such that with this arrangement, the spring urges the disc 60 toward the valve seat 102 to assist in closing the valve, particularly when the valve is installed in an orientation other than horizontal as shown in FIG. 10. It may also be noted that since the pin 120 is not a hinge pin, it does not have to be precisely parallel with the seating face of the disc, such that the alignment of the bores in which the pin is held are not critical.

In the various forms of the valve 90 as shown, the valve body 92 is provided with sealing gaskets 126 at the opposite ends thereof and conventional pipe flanges 128 are secured against the gaskets 126 by bolts 130 to provide a complete valve construction. With this arrangement, one of the flanges 128 holds the valve seat 102 in position in the counterbore 98 and the valve seat may be readily replaced by disassembling the flanges 128 from the valve body.

Figure 15:
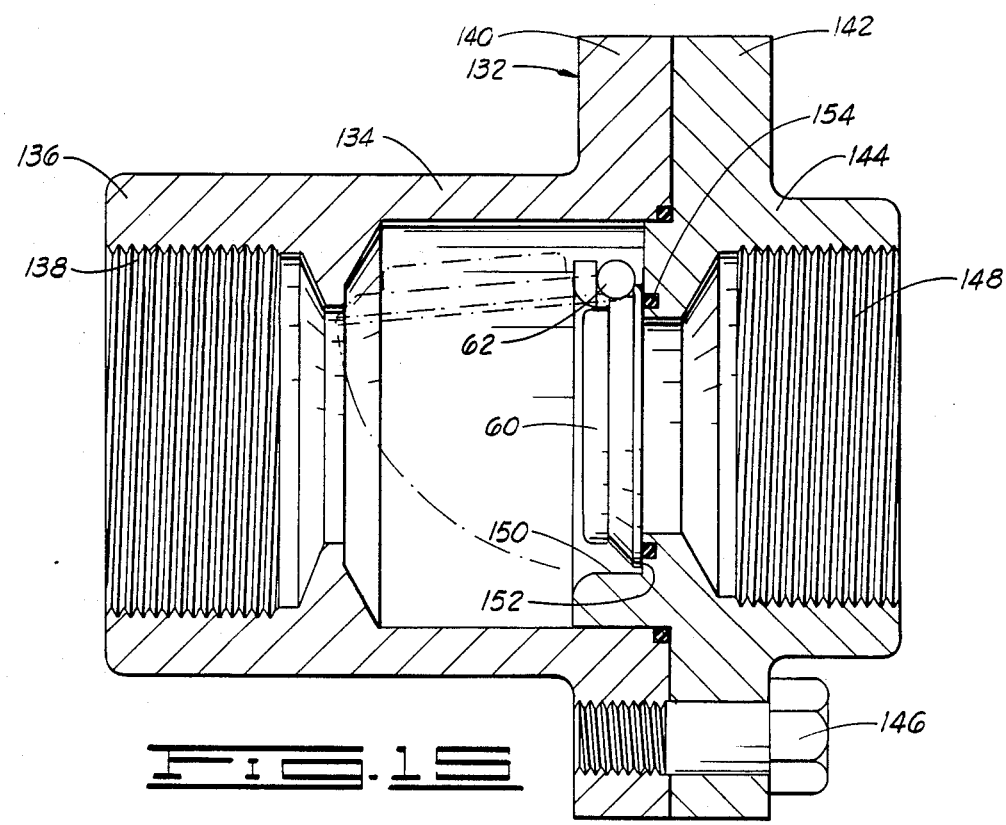
FIG. 15 is a cross sectional view of another form of valve constructed pursuant to this invention.

Another modified valve is illustrated in FIG. 15 and is generally designated by the reference character 132. The valve 132 comprises a tubular valve body 134 having one end 136 internally threaded at 138 to form a threaded pipe connection. The opposite end of the valve body 132 is provided with a flange 140 which mates with a flange 142 of a tubular fitting 144. The flanges 140 and 142 are interconnected by suitable bolts 146 to provide a complete valve construction. It will also be noted that the fitting 144 is provided with internal threads 148 to form a threaded pipe connection.

Figure 16:
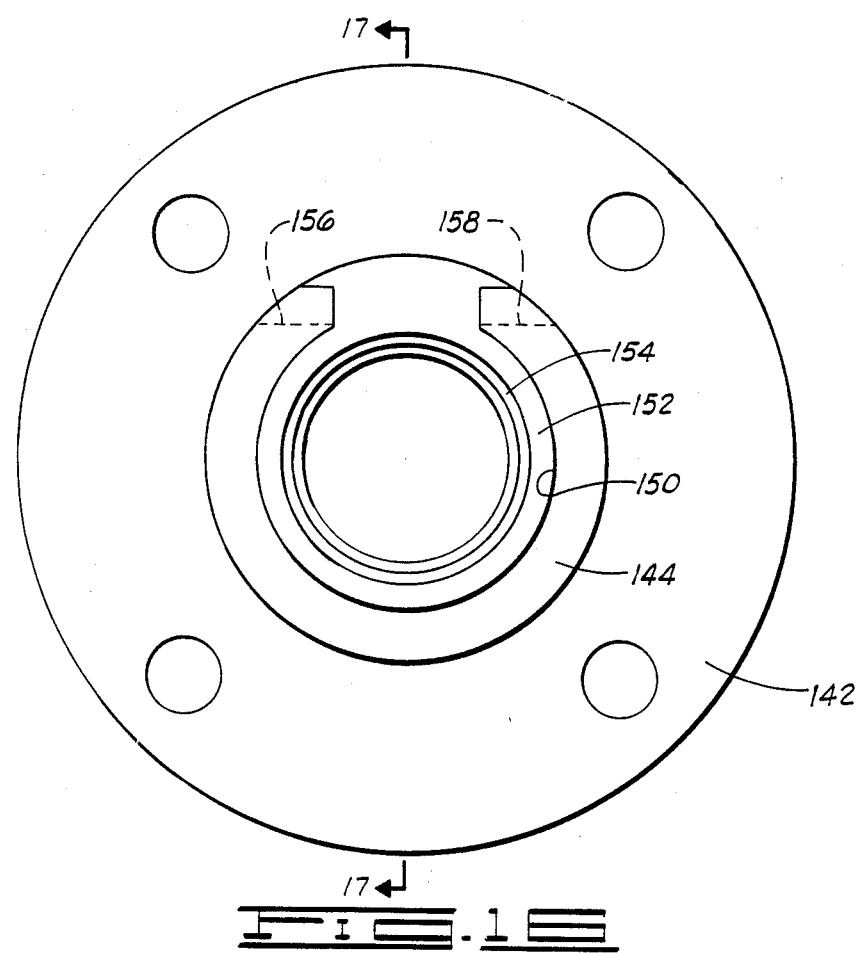
FIG. 16 is an end view of the fitting shown at the right-hand side of the valve of FIG. 15, looking at the left-hand end of the fitting in the position shown in FIG. 15.

The tubular fitting 144 is shown separately in FIGS. 16 and 17. A counterbore 150 is provided in the inner end of the tubular fitting 144 to form an annular shoulder 152 facing the interior of the valve body 134 which provides a valve seat. A suitable sealing ring 154 is mounted in a mating groove in the seating face 152 to mate with the valve disc 60. It should also be noted at this point that the diameter of the counterbore 154 and the outer diameter of the valve disc 60 provides a diametrical clearance of from 1/64" to 3/32", such that the counterbore 150 provides a valve cage to guide the disc 60 onto and from the valve seat 152.

As shown most clearly in FIGS. 16 and 17, the tubular fitting 144 is provided with a pair of aligned grooves 156 and 158 communicating with the counterbore 150 for the reception of the hinge pins 62 of the valve disc, and therefore form the hanger means for the valve disc. The relative sizing of the grooves 156 and 158 with respect to the hinge pins 62 is the same as previously described in connection with FIGS. 1-5 in order that disc 60 can move a limited distance to and from the valve seat 152 along the axis of the valve seat.

FIG. 18 illustrates another form of valve, generally designated by reference character 160 which basically comprises a tubular valve body 162 and end fitting 164. In this construction, the fitting 164 is secured in one end 166 of the valve body 162 by mating threads 168, and a suitable sealing ring 170 is positioned between the fitting and the valve body for sealing purposes. In this form of valve, both the valve body 162 and fitting 164 are provided with internal threads 172 for interconnection of the valve into a conduit.

Figure 19:
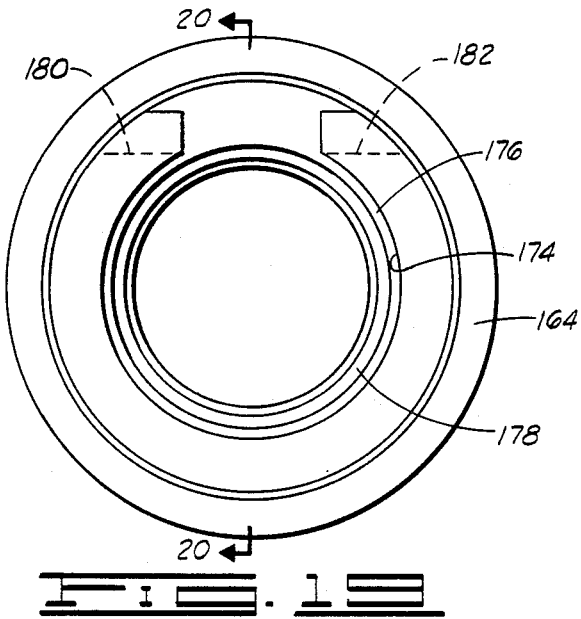
FIG. 19 is an end view of the fitting shown at the right-hand end of the valve of FIG. 18, looking at the left-hand end of the fitting as shown in FIG. 18.
Figure 20:
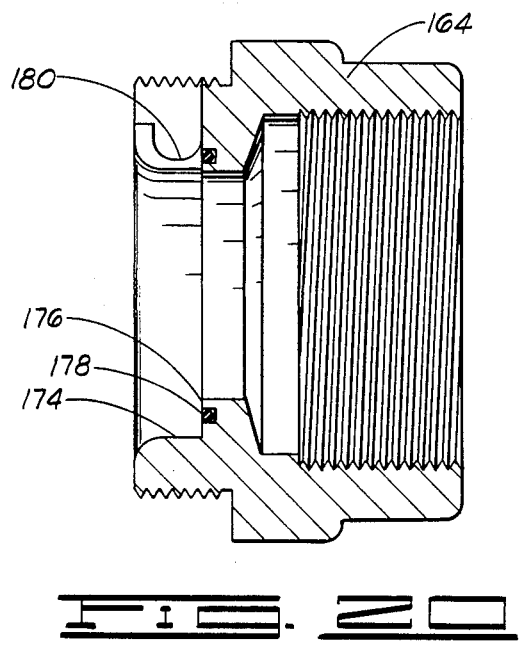
FIG. 20 is a cross sectional view taken along lines 20—20 of FIG. 19.

The end of the fitting 164 extending into the valve body 162 is provided with a counterbore 174 which forms an annular shoulder 176 facing the interior of the valve body 162. The shoulder 176 forms a valve seat and is provided with a suitable sealing ring 178 mounted in a mating groove therein. The fitting 164 is shown separately and in detail in FIGS. 19 and 20 for clarity of illustration. As shown therein, a pair of aligned grooves 180 and 182 are provided in the fitting 164 in communication with the counterbore 174 to form hanger means for the hinge pins 62 of the valve disc 60. The relative sizing of the hinge pins 62 and the grooves 180 and 182 are the same as previously described in connection with FIGS. 1-5, such that the valve disc 60 may move a limited distance to and from the valve seat 176 along the axis of the valve seat. Also, the diameter of the counterbore 174 is sized with respect to the outer diameter of the valve disc 60 to provide a diametrical clearance of about 1/64" to 3/32", such that the counterbore 174 forms a valve cage to guide the disc 60 to and from the valve seat.

Figure 21:
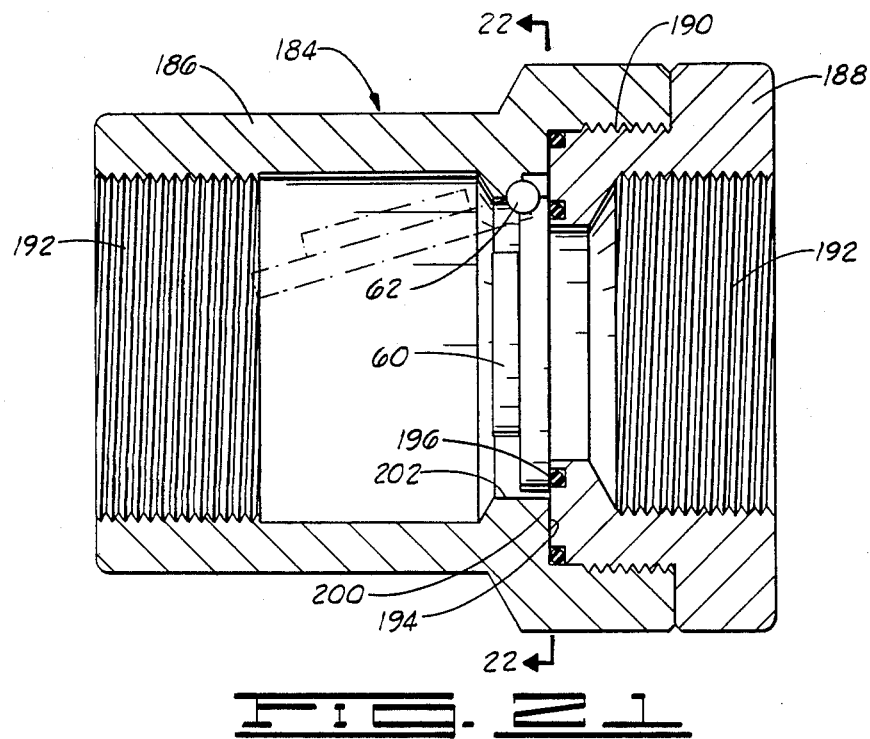
FIG. 21 is another form of valve constructed pursuant to this invention.
Figure 22:
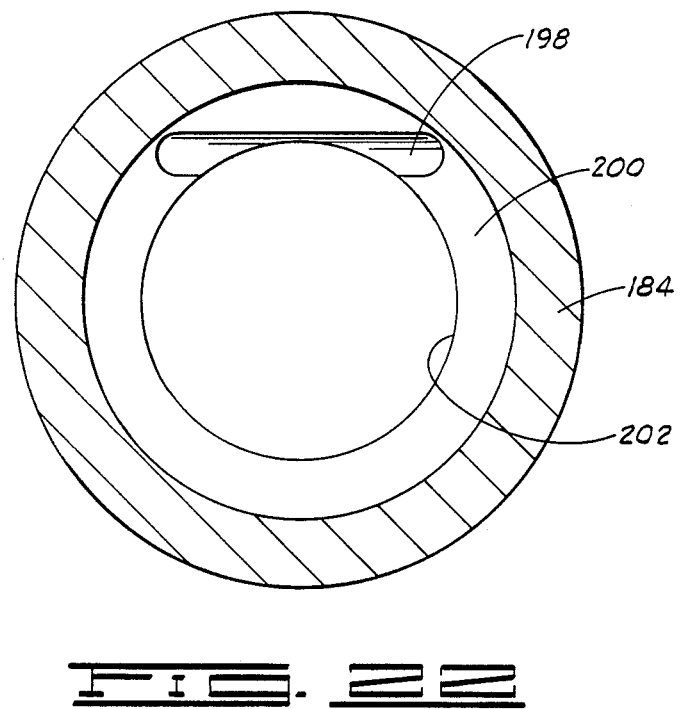
FIG. 22 is a cross sectional view taken along lines 22—22 of FIG. 21 with the valve disc removed.

Another form of swing check valve, generally designated by reference character 184 is illustrated in FIG. 21. The valve 184 basically comprises a tubular valve body 186 having an end fitting 188 threadedly secured to one end thereof by mating threads 190. The opposite end of the valve body 186 and the fitting 188 are each provided with internal threads 192 for threaded connection to adjacent sections of a conduit. In this construction, the inner end face 194 of the fitting 188 forms a valve seat having a suitable sealing ring 196 positioned in a mating groove therein. The valve disc 60 is supported from a hanger means formed in the valve body 186 as shown most clearly in FIG. 22.

A groove 198 is formed in the end 200 of the valve body abutting the valve seat 194, with the groove 198 communicating with the adjacent inner periphery 202 of the valve body. The groove 198 forms hanger means or the hinge pins 62 of the valve disc 60, such that the valve disc 60 can swing between the solid line and phantom line positions illustrated in FIG. 21. The relative dimensions of the groove 198 and the hinge pins 62 are similar to those discussed in connection with FIGS. 1-5, such that the valve disc 60 may move a limited distance to and from the valve seat 194 along the axis of the valve seat. Also, the adjacent inner periphery 202 of the valve body forms a valve cage surrounding the major portion of the outer periphery of the valve disc 60 with a diametrical clearance therebetween of from about 1/64" to 3/32", such that the surface 202 guides the disc 60 to and from its seating position on the valve seat 194.

Figures 23, 24:
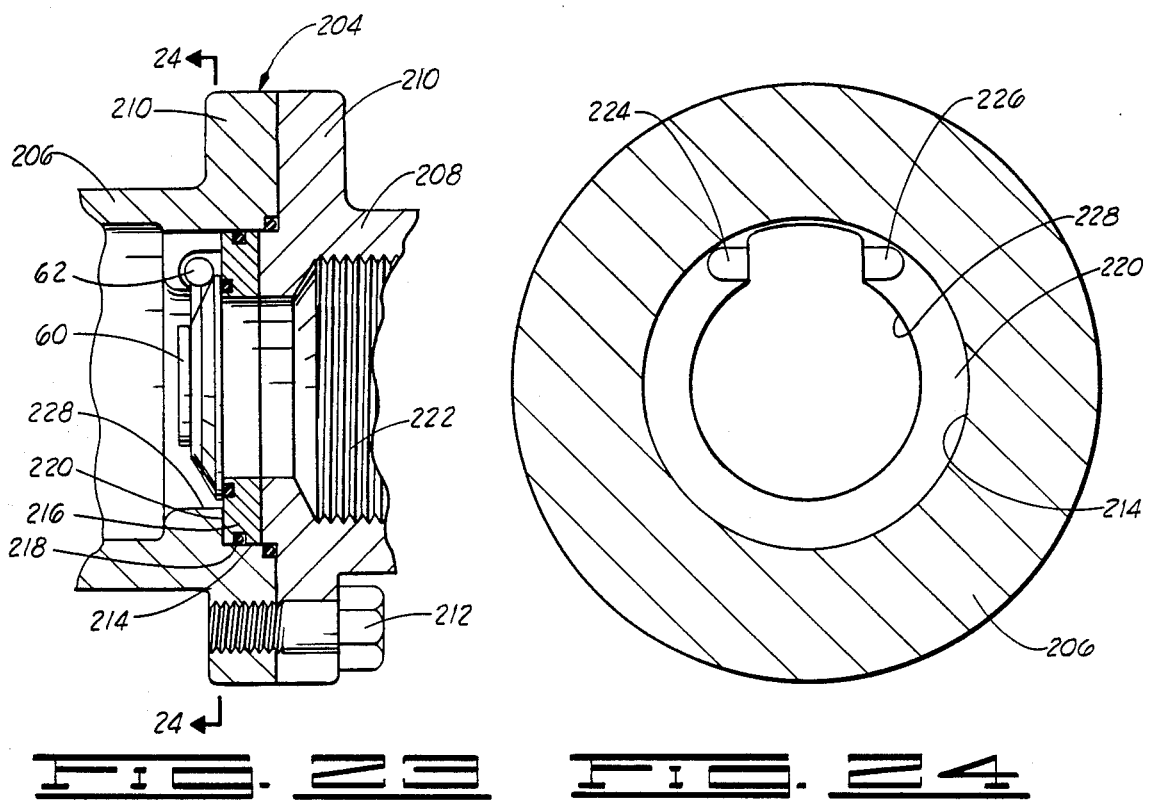
FIG. 23 is a cross sectional view through a portion of another form of valve constructed pursuant to this invention.
FIG. 24 is a cross sectional view taken along lines 24—24 of FIG. 23 with the valve disc removed.

FIG. 23 is a partial cross sectional illustration of another form of valve generally designated by the reference character 204 which comprises a tubular valve body 206 and tubular end fitting 208 wherein the valve body and fitting are each provided with flanges 210 interconnected by suitable bolts 12. In this construction, a counterbore 214 is provided in the end of the valve body 206 facing the fitting 208 to receive a separate valve seat 216. A suitable sealing ring 218 is positioned in a corresponding annular groove around the outer periphery of the valve seat to sealingly engage the walls of the counterbore 214. The valve seat 216 is held against the shoulder 220 formed at the end of the counterbore 214 by a reduced diameter end 222 of the fitting 208 which extends a short distance into the counterbore 214.

As shown most clearly in FIG. 24, a pair of grooves 224 and 226 are formed in the end 220 of the counterbore 214 to communicate with the inner peripheral surface 228 of the valve body 206. The grooves 224 and 226 form hanger means for receiving the hinge pins 62 of the valve disc 60. The relative dimensions of the grooves 224 and 226 with respect to the hinge pins 62 is the same as described in connection with FIGS. 1-5, such that the valve disc 60 may move a short distance to and from the seat 216 along the axis of the seat. Also, the inner periphery 228 of the valve body 206 surrounds the major portion of the outer periphery of the valve disc 60 to form a cage and guide the disc 60 to and from the seat 216. The diametrical clearance between the inner periphery 228 of the valve body and the outer periphery of the disc 60 is from about 1/64" to 3/32".

Figure 25:
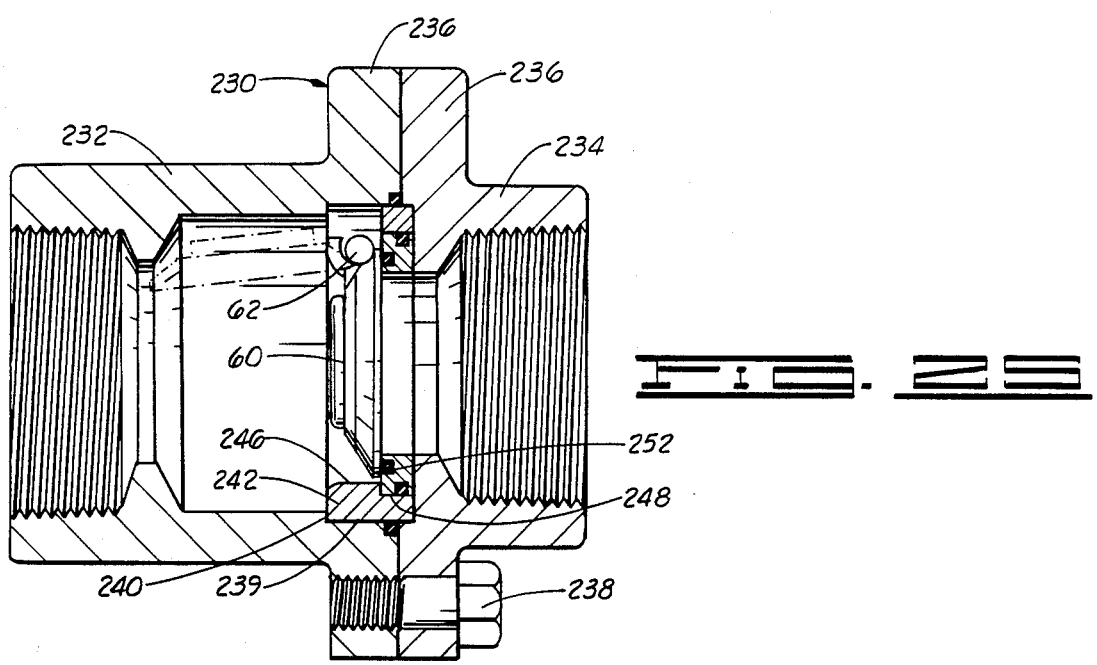
FIG. 25 is a cross sectional view of another form of valve constructed pursuant to this invention.

The swing check valve generally designated by reference character 230 and illustrated in FIG. 25 also includes a tubular valve body 232 and a tubular end fitting 234. The valve body and end fitting are provided with mating flanges 236 interconnected by suitable bolts 238 to retain the valve in assembled relation. The end of the valve body 232 adjacent the fitting 234 is provided with a counterbore 239 forming an annular shoulder 240 facing the respective end of the valve body. A valve cage 242 fits into the counterbore 238 and abuts the shoulder 240 when the valve is assembled. The cage 242 is illustrated separately and in some detail in FIGS. 26 and 27.

As shown, the cage 242 comprises a ring having a pair of aligned grooves 244 therein communicating with the inner periphery 246 of the cage ring 242. The grooves 244 form hanger means for the hinge pins 62 of the valve disc 60 in the same manner as previously described to not only pivotally support the valve disc, but also to permit the valve disc to move a limited distance toward and from the valve seat to be described.

The valve cage 242 has a counterbore 248 in the end thereof forming a shoulder 250 facing away from the valve body 232. A valve seat ring 252 (FIG. 25) is positioned in the counterbore 248 against the shoulder 250 to form the usual valve seat for the valve disc 60. The valve seat 252 is held in the valve cage counterbore 248 by mating surfaces of the tubular fitting 234. Thus, the valve seat 252 may be readily replaced by disassembling the valve 230.

Another form of valve, generally designated by reference character 254 is illustrated in FIG. 28. In this form of valve, the valve seat 256 is threaded into a counterbore 258 at one end of the tubular valve body 260. Diametrically opposed depressions 262 are provided in the outer end 264 of the valve seat to facilitate the threading of the valve seat 256 into the valve body. The inner end 260 of the valve seat forms a seating face having a sealing ring 265 therein to receive the valve disc 60. The valve disc 60 is mounted in suitable hanger means 266 formed in the valve body, and a valve cage surface 268 is formed in the valve body to guide the valve disc 60 to and from the seat 256 in the manner previously described.

A modified valve 254A is illustrated in FIG. 29. In this form of valve, the valve seat 256A is a separate ring inserted in a counterbore 270 formed in the respective end of the valve body 260A to mate with the valve disc 60. The valve seat ring 256A is held in the counterbore 270 by a separate retaining ring 272 threaded into the outer end of the counterbore 270. Thus, the valve seat 256A may be readily replaced.

Changes may be made in the combination and arrangement of parts or elements as heretofore set forth in the specification and shown in the drawings without departing from the spirit and scope of the invention as defined in the following claims.

What is claimed is:

1. A swing check valve, comprising:
   a tubular valve body internally threaded at one end;
   a substantially round valve disc in the valve body having a seating face and having a hinge pin thereon extending parallel with the seating face thereof; and
   a tubular fitting secured to the opposite end of the valve body having one end portion thereof extending into the valve body and the opposite end portion thereof internally threaded; said one end portion forming a cage surrounding a portion of the disc when the disc is in a closed position and a valve seat adjacent the cage sized to receive the seating face of the disc; and the opposite end portions of said cage being grooved to form bearing areas to support the opposite end portions of said hinge pin, whereby the disc may swing in the valve body between open and closed positions.

2. A swing check valve as defined in claim 1 wherein the valve body and tubular fitting have mating pipe flanges thereon for securing the fitting to the valve body.

3. A swing check valve as defined in claim 1 wherein said one end portion of the tubular fitting is threaded into the respective end of the valve body.

* * * * *